July 12, 1955
H. JONAS
2,712,713
METHOD OF TREATING SEEDS BY HIGH FREQUENCY FIELDS
Filed Feb. 23, 1950
6 Sheets-Sheet 1
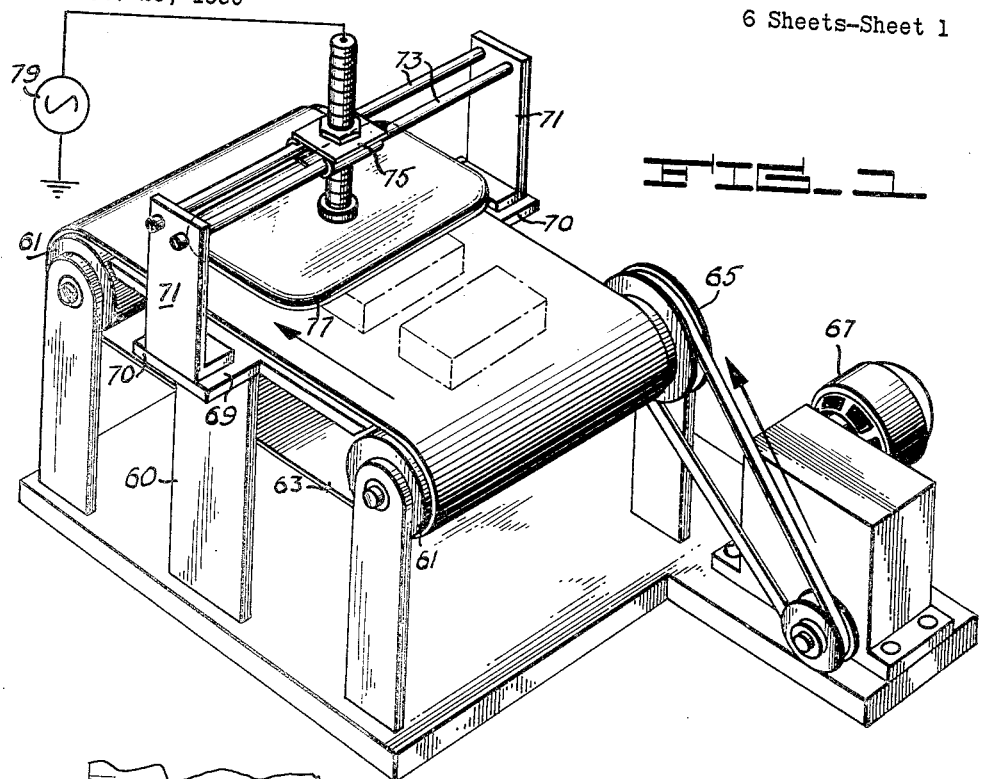
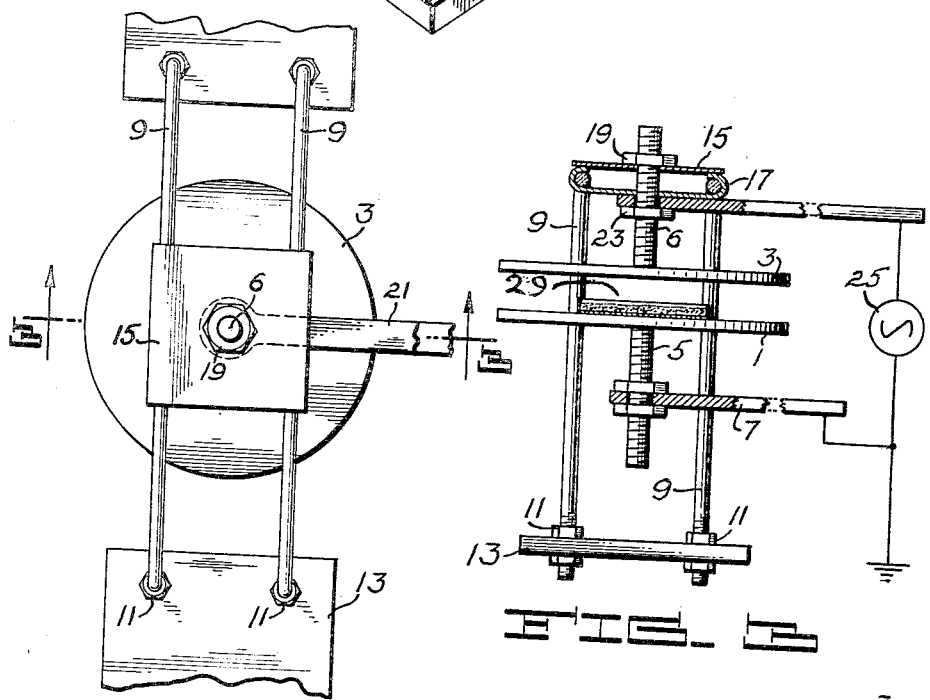
Inventor
HERBERT JONAS
By Lippincott & Smith
Attorneys July 12, 1955
H. JONAS
2,712,713
METHOD OF TREATING SEEDS BY HIGH FREQUENCY FIELDS
Filed Feb. 23, 1950
6 Sheets-Sheet 3
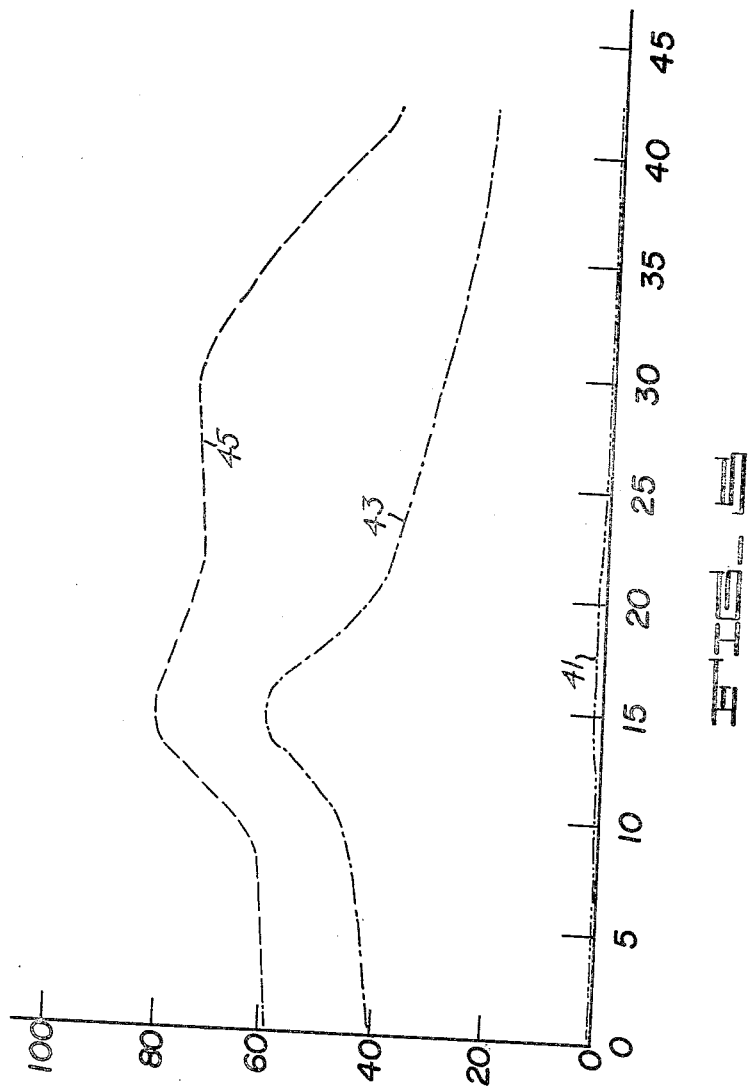
Inventor
HERBERT JONAS
By Lippincott & Smith
Attorneys

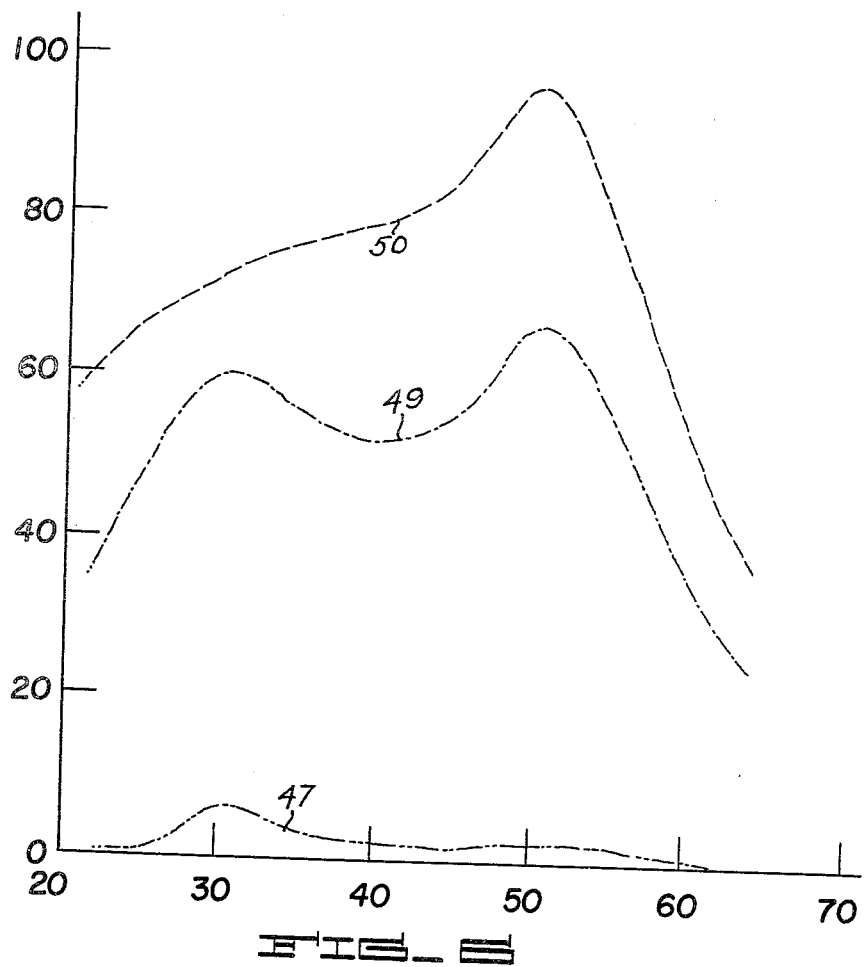

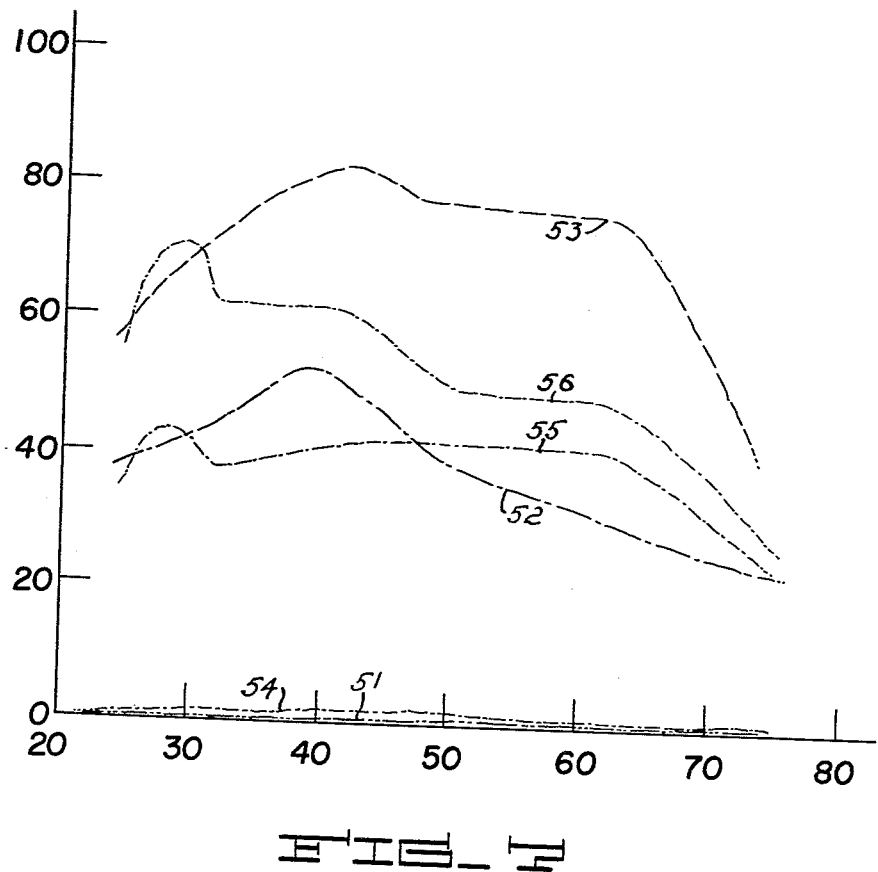

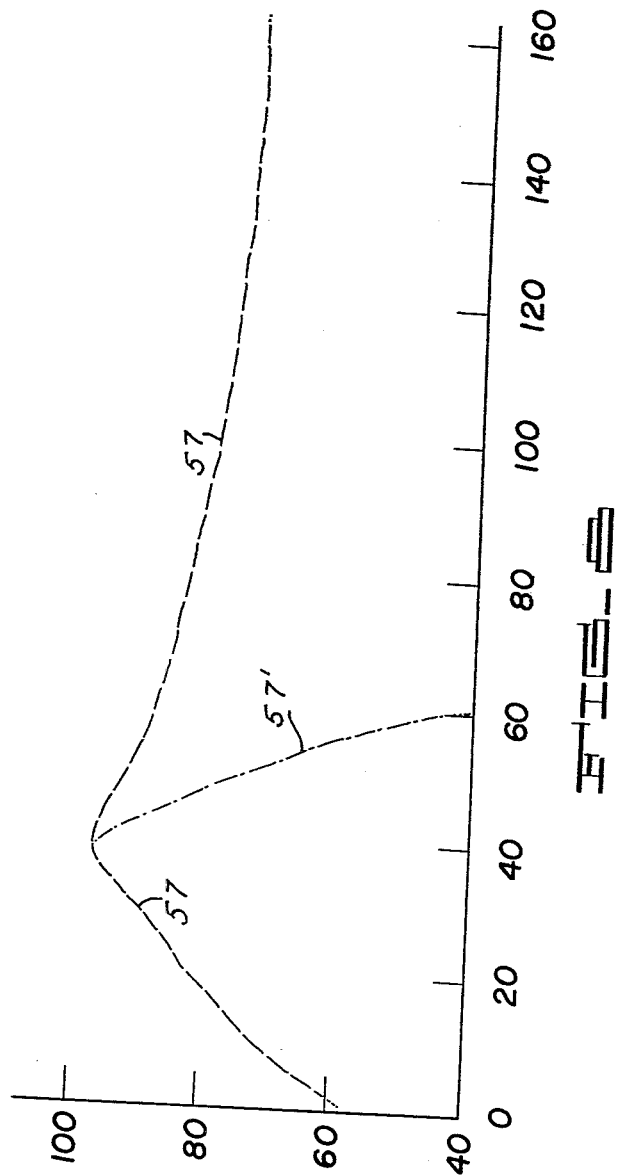

United States Patent Office 2,712,713
Patented July 12, 1955

2,712,713

METHOD OF TREATING SEEDS BY HIGH FREQUENCY FIELDS

Herbert Jonas, Berkeley, Calif.

Application February 23, 1950, Serial No. 145,650

7 Claims. (Cl. 47—1.3)

This invention relates to methods of treating plant seeds for the purpose of speeding the germination process and improving the percentage which germinate.

It is well known that of seeds planted only a certain proportion will germinate and grow. This percentage varies very widely with species, variety, stock, age, and the conditions under which the seeds are grown, but out of a stock of seeds which have been raised under the best conditions, of a given variety and in a given season, the percentage is remarkably constant and with selected stock may vary in accordance with the factors given above between approximately fifty percent and approximately ninety-five percent.

Good seed is expensive. Furthermore, its planting and the care of the plants after planting involve a large amount of labor and it is of obvious advantage to increase the percentage of germination. It is also of advantage both to increase the speed of germination (i. e., shorten the time before germination occurs and the first shoots appear) and to shorten the period between the germination of the first seeds of a planting and the last. This is particularly true in localities where the growing season is short.

Various methods have been proposed and tried for the speeding of these processes. Some of these methods have been quite successful; both physical and chemical means have been used but most of them have required that the treatment be given immediately before planting since the effect has worn off quite rapidly after the treatment has been given. This is a serious defect of any such treatment, as some of the treatments are quite complex and need to be applied with considerable care and it is seldom that the one who plants the seeds has the facilities or skill to apply the treatments to best advantage.

Certain seeds retain their ability to germinate when stored for long periods. Others lose this ability very rapidly as they age and dry out in storage, and once the ability has deteriorated, past methods of treatment have shown little power to restore it in any appreciable degree.

Among the objects of my invention, therefore, are to provide a method of treatment which will increase the percentage of seeds which will germinate and decrease the spread in time between the first germinations and the last of a given planting; to provide a method of treatment having lasting effects, so that treated seeds may be stored for considerable periods without losing the capacity for increased germination and can, moreover, be treated at a central location and, thereafter, be subjected to the usual delays in shipment and distribution without losing the advantage of such treatment; to provide a treatment which will enable otherwise perishable seeds to be stored for considerable periods; and to provide a treatment which will, in some degree at least, restore viability to dried seeds.

Among the many methods which have been suggested in the past for treating seeds to give them the properties here contemplated has been that of subjecting them to high-frequency electric or magnetic fields, and there is considerable literature which has been published, particularly abroad, covering such methods of treatment. The publications on this subject are, however, highly contradictory; in very few cases has it been possible for other experimenters to repeat the results found by the authors of the initial publications. In most cases, the data as to the conditions of treatment have been fragmentary, which may account for this failure, but the fact remains that even where data appeared complete the repetition of an experiment originally claimed to have increased the germinating properties of seeds has resulted either in negative findings, in that the treatment has appeared to be entirely without effect, or has actually decreased the germinating capabilities of the seeds.

One of the most explicit publications of the type mentioned is the British Patent No. 417,501 accepted September 28, 1934. This patent contains explicit directions for determining the resonance frequencies of dipolar bodies, and requires that the treatment be given at or very close to such resonance frequencies, and it is claimed that bean seeds, previously swollen with water, were exposed for thirty seconds at a temperature of thirty-five degrees C. to fields with frequencies corresponding to wavelengths of 28 cm. and 87 cm. (1071 and 345 megacycles respectively), the total output of the generator being 1.5 watts. After four weeks such seeds are asserted to have grown twice as much as similar untreated seeds. It is to be noted that no such claim is made in the corresponding U. S. Patent 2,089,966, issued August 17, 1937, to Kassner. It is to be noted, also, that the seeds thus treated were previously swollen and hence in no condition to be stored, and, furthermore, that the frequencies applied are asserted to be extremely critical.

Treatment in accordance with my invention also involves the use of alternating or oscillating electrical fields, but it is not primarily concerned with resonance phenomena, the seeds are not swollen with water before treatment, but are preferably in the condition in which they would be normally kept prior to planting. Broadly considered, the method of my invention comprises the steps first, of compacting the seeds to be treated so as to minimize the air spaces included in the mass of seeds and render the dielectric constant of the mass, considered as a whole, as high as possible. Such compacting can be done in open vessels or in paper or cloth bags, but the seeds should be to some degree open to the air in order to permit the escape of water vapor or gases which might be liberated in the treatment. The compact mass of seeds is then exposed to an oscillating electric field of considerable strength. Neither frequency nor field strength is very critical; the former may range upward from 10 megacycles per second into the microwave range. It definitely should not extend into the infrared but should remain in the range where the voltage gradient can be measured by electrical means. The optimum field strength is that which will cause the mass of seeds to absorb power at a rate of between 10 and 30 watts per milliliter of seeds, depending upon the species treated and the condition of the seeds, but with an optimum value of absorption quite close to 14 watts per milliliter under most circumstances, which implies a corresponding voltage gradient (R. M. S.) of from 340 to 360 volts per centimeter. This treatment should be continued long enough to raise the temperature of the seeds between 10° C. and 25° C., depending upon the initial temperature of the seeds, but in no instance to exceed a final temperature of 55° C., and, it is to be noted, with a more critical range of temperature rise if the treatment is started with seeds at an initial temperature near the freezing point than if the initial temperature lies within the ordinary "room temperature" range of from, say, 20° C. to 25° C.

This invention will be better understood from the ensuing detailed description, taken in connection with the accompanying drawings wherein:

Fig. 1 is a perspective view of a device for treating seeds commercially in accordance with this invention;

Fig. 2 is a plan view of a similar device for treating test samples of seeds;

Fig. 3 is an elevation, partly in section, of the device of Fig. 2, the plane of section being indicated by the lines 3—3 of Fig. 2;

Figure 4:
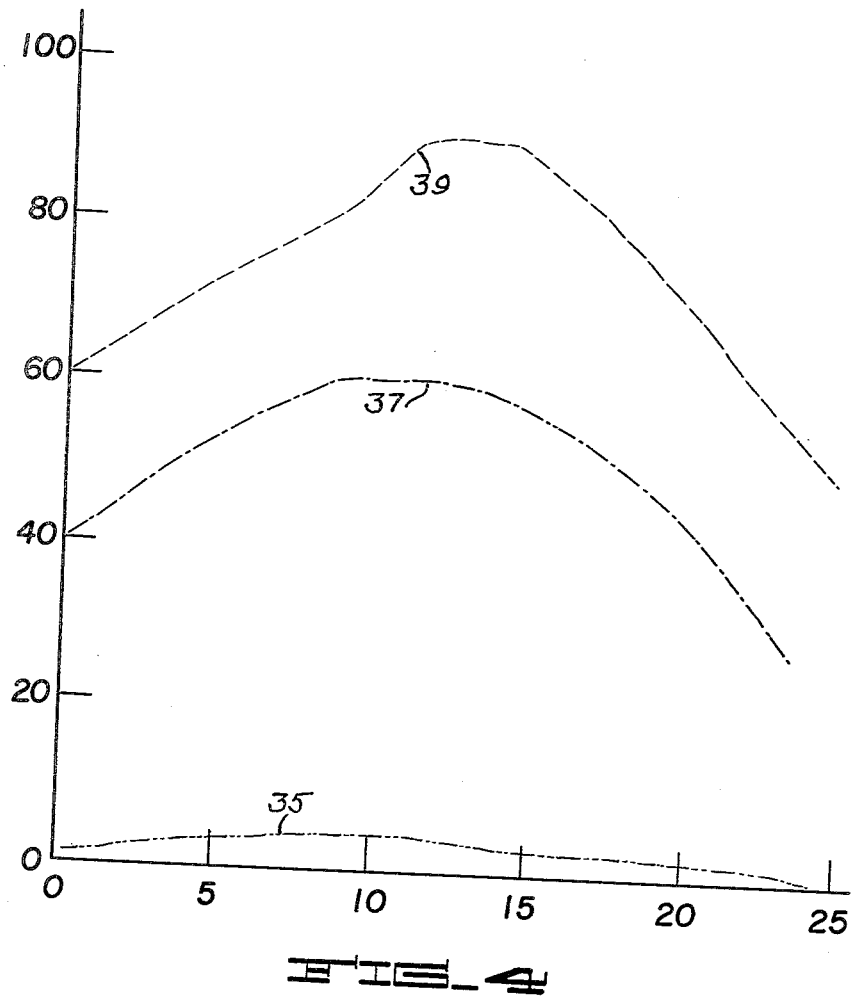

Fig. 4 comprises graphs showing the relation between power input per milliliter and the percentage of onion seeds showing germination on the first, median and final days of such germination;

Fig. 5 comprises similar graphs showing the percentage of germination of carrot seeds with respect to power input per milliliter;

Fig. 6 is a group of graphs showing the relationship between final temperature and percent germination of onion seeds;

Fig. 7 is a similar group of graphs with respect to carrot seeds, this figure also showing, for comparison, the effect of treating seeds from the same batch with infra red radiation; and Fig. 8 is a graph indicating the relationship between total energy input in calories per milliliter and percentage germination.

Economically the treatments of the class here considered are most important in connection with the seeds of edible vegetables. Such vegetables comprise many species and varieties of such species, differing widely in seed structures and seeds, even of the same variety, will differ in such physical characteristics as moisture content and such chemical characteristics as percentages of various sugars, proteins and fats in accordance with the conditions under which they are grown, including the nature of the soil and the weather conditions. It would therefore be logical to assume that the treatment required to give the best results would vary and experiment has shown that this is broadly true. Best results with seeds of a given crop can therefore be obtained by treating a number of samples under slightly varying conditions within the range as herein set forth, making sample plantings of the seeds thus variously treated, with control plantings of untreated seeds, and then treating the bulk of the seeds in the manner which has shown the greatest percentage improvement in the samples.

For such tests it is desirable to have available equipment suitable for treating samples of this character and since, with such equipment, it is possible independently to adjust the parameters entering into the treatment and therefore define more exactly the optimum conditions for treatment, such a device will first be described, reserving until later the showings of the manner in which the treatment may be applied as a commercial process.

Figures 2 and 3 are respectively plan and sectional views of one form of such sample or batch treater. In this case the actual treatment is accomplished between a pair of condenser plates 1 and 3, each of which is mounted on threaded stems 5 and 6 respectively. The plate 1 is connected to ground through the stem 5, which is threaded through a massive conducting bar 7, this bar being supported in any convenient manner, as the method of support is not important since it is grounded as shown. The upper plate 3 operates at high potential and since it also operates at high frequency it is desirable that it be so mounted as to minimize dielectric losses in the supporting structure. In the present case this is accomplished by means of a pair of U-shaped Pyrex glass support rods 9, which are mounted in inverted position with their ends supported by clamps 11 from a table 13, which may be of any convenient material, either conducting or insulating.

A clip formed of brass or other metallic plates 15 and 17 spans the Pyrex rods 9 at the center of the horizontal legs thereof and forms a support for the upper plate 3, the stem 6 of the latter projecting through a hole in the middle of the clip. An adjusting nut 19, threaded on the stem 6, determines the position of the plate, and a high tension lead 21 (preferably of heavy copper, silver plated) is clamped between the clip portions 17 and a lock nut 23. A high frequency generator 25 feeds the conductors 7 and 21 as indicated schematically in Fig. 3.

It should be obvious to anyone skilled in the art that numerous other structures for supporting the plates 1 and 3 are possible. The characteristics of the structure shown are that the insulating material used to support the high potential plate is one having low dielectric losses and that no part of the structure is in a region of high potential gradient. This is important because a poor dielectric exposed to fields of the intensity and frequency herein employed would quickly be destroyed and, moreover, the use of low loss materials in a high efficiency circuit permits the measurement of the actual power applied in the treatment to a fairly high degree of accuracy, by the measurement of the D. C. power supplied to the system.

In the equipment specifically described here the generator 25 operates at a frequency between 43 and 44 megacycles per second and comprises a cavity oscillating circuit driven in a fundamental mode by tubes operated "Class C," i. e., biased materially beyond cutoff. The cavity resonator is excited at its lowest frequency mode and delivers a substantially pure sine wave of the frequency mentioned. The losses in an oscillator of this character, feeding treatment device of the type described, are so low as to be negligible in comparison with the power absorbed by the treated seeds themselves; the voltage losses being not more than 4%, and the power absorbed by the seeds can therefore be computed by integrating the product of the current and voltage supplied by the tube over the portion of the cycle in which the tube is carrying current. Experiment with the equipment indicated that measurements of direct current power checked, within the accuracy of the available instruments, with the alternating current power absorbed by the system and that therefore measurement could be made with D. C. instruments to the required degree of accuracy without the complexities and uncertainties which would have been involved in making a large number of more or less routine tests on the radio frequency side of the apparatus. Moreover, in the particular equipment used, the peak voltages as delivered by the oscillator were approximately equal to the D. C. potential supplied to the tube, and accordingly the R. M. S. potentials of the sine wave output of the resonator could readily be computed. It is to be noted, however, that the precise form of the oscillator used to supply the fields is of no importance in connection with this invention, and therefore the oscillator is not shown in detail, the description thereof being given merely in support of the limiting of optimum values of the treatment quantities as will later be described.

In the particular equipment here described a tube rated at 5 kilowatts is used. The seeds to be treated are placed in a central container between the electrodes 1 and 3, and are compacted before treatment. For test or sampling purposes the most convenient container is a Petri dish 29, since such a dish has vertical sides and the thickness of the layer of seeds can be maintained substantially constant throughout. Equivalent results have, however, been obtained by placing the seeds in cloth or paper bags, but it is important that whatever type of container be used should not be hermetically sealed since this leads to the condensation of moisture in the upper layers and varies the dielectric constant of different portions of the mass of seeds, with the result that the power expended per unit volume is not a constant and the treatment is not uniform.

In equipment of the class described the power absorbed by the seeds being treated, the total energy absorbed, the time of treatment, the voltage gradient, the final temperature and the temperature rise are interdependent so that various of them may be considered as either independent or dependent variables in determining the optimum conditions of treatment. Certain of these quantities differ very widely as between various kinds of seeds. Certain other quantities, however, have proved to remain reasonably constant as between different seeds and these more constant factors have therefore been selected as the norms for optimum conditions of treatment. Thus a larger sample or thicker layer of seeds may require a greater separation of the electrodes in order that it may be introduced between them, resulting in both a lower overall voltage gradient and a lower gradient through the seeds themselves; this, in turn, results in a lower rate of power absorption and requires a longer treatment in order to liberate a given amount of energy per unit volume of seeds. The initial temperature determines, in part, not only the final temperature but also the temperature rise for a given amount of energy absorption.

Of the factors which remain fairly constant irrespective of variety of seed and conditions of treatment, one of the most important appears to be the total energy absorbed per unit volume of seed which has an optimum value very close to 37.5 calories per milliliter. This energy, again, is, for most seed, most effective when it is delivered at the rate of 14 watts per milliliter. This argues an optimum time of treatment in the neighborhood of eleven seconds, but, as will be shown in connection with the curves later to be described, neither of these factors is sharply critical and excellent results can be obtained by treatments departing materially from the optimum.

The factors just mentioned are illustrated in Figures 4 through 7. Fig. 4 comprises three curves, each of which represents the average of a number of experiments on onion seeds. Of these curves, curve 35 represents the percentage, out of a total sample, of seeds germinating upon the first day upon which any germination was apparent, plotted against radio frequency power input per milliliter absorbed thereby. Curve 37 is a similar curve of seeds germinating on the median day between the first and the final days on which there was germination, while curve 39 indicates the ultimate percentages of germination of the seeds planted. The points where these curves intersect the vertical axis indicate, of course, the percentage of germination of the controls, which showed an average of 60% germination on the final day and 40% on the median day. These control seeds showed a very small spread as between the various experiments, 40 to 41% having germinated on the median day and from 55 to about 68% having germinated on the final day. More important, however, is the shape of the curve for the final day and the marked peak in percentage germination that is indicated with a power input between 10 and 15 watts per milliliter. In this group of experiments the peak is fairly broad, but the optimum value of 14 watts per milliliter which has already been mentioned falls within the peak. By the time the treatment has been increased to 20 watts per milliliter, however, the average percentage of germination has fallen practically to the value observed with untreated seeds. It should be noted, however, that these are average values. With certain batches treated at 20 watts per milliliter the percentage of germination was below that of untreated seeds, while with others the percentage of germination was still rising slightly, from 75 to about 80%. The fact remains, however, that a considerable improvement was observed in all batches which had been treated at rates up to 14 watts per milliliter while thereafter the results became more uncertain. The value given as an optimum can therefore be taken as always safe in cases where individual test runs cannot be made.

The curves of Fig. 5 are similar curves showing the results of experiments performed on carrot seeds, curve 41 giving initial day values, curve 43 median day and curve 45 final day results. These curves also represent averages, and the peak at 14 watts per milliliter rate is even more sharply apparent, although it is to be noted that these seeds have not proved so sensitive to higher rates of radiation, and the drop to the same percentages as observed with untreated seeds does not occur until the power input reaches about 35 watts per milliliter. In these curves also the spread between the maximum and minimum values as observed in various samples was not so wide. Experiments with various other seeds, such as those of celery, tomatoes and beets, indicate similar results.

Figs. 6 and 7 indicate the effects of final temperatures on onion and carrot seeds respectively. Curve 47 of Fig. 6 shows first-day germination with seeds brought to various final temperatures, curve 49 median day results and curve 50 final day results. Of these latter curves curve 50 is probably the more important, and the sharp peak with respect to seeds which have been brought to a temperature of 50° is as notable as is the sharp drop which occurs when the temperature is raised beyond this point. With the optimum treatment the percentage of germination has been raised from 60% of a total to over 95%, representing about a 60% greater yield from a given amount of seeds.

In Fig. 7 curves 51, 52 and 53 represent, respectively, the effects of first, median, and final day germination of carrot seeds as functions of final temperatures. In this case the peak is flatter and occurs at a final temperature of about 40° C., but the seeds are more resistant to excessive temperatures and no sharp lethal effect occurs until the temperature has been raised above 60°. For comparison, there have also been plotted in this figure, curves 54, 55, and 56 which correspond with those already described but which show the effect of raising the temperature by means of infra-red radiation instead of the radio frequency treatment which is the subject of this invention. These curves indicate that it is not the temperature itself which causes the increased germination, although small amounts of infra-red treatment do give an improvement. Where the temperature is raised above a final value of 30°, however, a sharp drop occurs in the infra-red curves. Raising the temperature to the 40° value, which gives the best results with radio frequency treatment, gives results, with infra-red, no better than with untreated seeds and above this value infra-red reduces germination quite sharply, although the drop is not so rapid as where seeds are overtreated with radio frequency. The reasons for these effects will be discussed hereinafter.

Seed treatment by the method of my invention will ordinarily be performed with seeds starting at normal room temperatures as hereinbefore defined, and therefore final temperature is usually a reasonably good index of the total amount of energy released in the seeds. Undoubtedly the effects produced are in part temperature effects, but the curves of Fig. 8 indicate that this is not wholly true. Curve 57 shows the average of a number of experiments which include both seeds treated at normal temperature and those with precooled seeds, percentage germination being plotted against total energy input expressed in calories per milliliter. The peak at a value of 37.5 calories per milliliter is notable. Above this value sharply different effects occur, as indicated by the branch 57' of the curve. A greater total input has a highly unfavorable effect where the initial temperature is high, but in other cases, where this greater input does not raise the temperature above the critical value the effect is not lethal. There is some evidence, however, that the rise in temperature which may be permitted to precooled seeds is more critical than in the case of seeds treated at room temperature.

In operating the method of my invention commercially it is possible, of course, to use equipment substantially similar to that which has been described for test purposes but it is obvious that this would be an uneconomical method of operation. There are many ways in which the seeds to be treated may be introduced into a field of the character here described and Fig. 1 illustrates in somewhat of a diagrammatic manner one of the simplest of these methods. The device shown in the figure comprises a frame 60 upon which are journaled a pair of rollers 61 which carry a wide belt 63. Preferably, although not necessarily, frame, pulleys and belt are all of metal, one good method of forming the belt being of a band of thin steel which is copper or silver plated, but a belt with a metalized surface or one of wire screen can also be used. Pulleys and belt are driven by a drive pulley 65 belted to an electric motor 67. The entire structure is grounded.

The frame 60 includes a table portion 69 which supports the upper reach of the belt 63 and projecting from the sides of the table are lateral extensions 70 carrying vertical struts 71. The pair of Pyrex rods 73 extend transversely across the belt between the struts and carry a supporting clip 75 from which the high tension electrode 77 is supported in substantially the same manner as the electrode 3 from the clip 15—17 in the equipment of Figs. 2 and 3.

A suitable high frequency generator 79 is connected between the electrode 77 and to ground. Electrode 77 differs from electrode 3 in being larger in size and in being formed with gently rounded edges so as to prevent a concentration of field strength at this point. The seeds, in cloth or paper bags or even in open cardboard boxes, are placed on the belt and carried beneath the electrode 77, the belt 63 operating as the grounded electrode. The speed at which belt 63 travels is so adjusted with relation to the absorption coefficient of the seeds and the field strength as to subject the seeds to the field for the proper time, either in accordance with the average values as herein given or with specific values as determined by tests of the seeds to be treated.

The equipment of Fig. 1 is shown only as one of many ways in which the treatment may be accomplished. Another possible method would be to set up fields of the required strength as either standing or travelling waves within a wave guide and other methods of generating the field will be evident to those skilled in the art.

It has been stated above that the frequencies which may be employed in the method of this invention are not critical in value, but an optimum does exist which can be explained upon a relatively simple electrical basis. The seeds under consideration all comprise outer coatings of a more or less woody character enclosing an endosperm which contains various fats and sugars and, in germination, supplies nutriment for the embryo which it encloses. When subjected to an electrical field the various layers of these seeds act like leaky condensers, i. e., minute ideal condensers each bridged by a resistance. Electrically the layers are in series and the distribution of the energy which is released within them depends upon the dielectric constant of the various layers as well as the value of the bridging resistance.

The endosperm and embryo, where the fats, proteins and carbohydrates are concentrated, have a higher dielectric constant than the woody layers, and hence act to concentrate or focus the lines of force of the electrical field and thus tend to localize the absorption of energy in the interior of the seed and in the portions thereof where changes in chemical composition can be expected to have the greatest effect on the life processes.

The work of various prior investigators has shown that the materials of the endosperm and embryo, being constituted predominantly of molecules of large size, have absorption bands extending from about 10 m. c. to about 300 m. c. Within this rather wide band there are no notable peaks; a fact which might be anticipated when the complex chemistry and varied compositions of the organic materials referred to are considered. No individual resonance appears to dominate, such resonance peaks as may exist overlapping so as to form a substantially flat topped curve rising gradually from the minimum frequency mentioned, remaining fairly constant from somewhere in the neighborhood of 30 m. c. to somewhere between 200 and 250 m. c. and then falling gradually to the high frequency limit of the band. Absorption bands of this character are analogous to the molecular band spectra for light as contrasted with atomic line spectra.

Some beneficial results are obtained by treatment with frequencies lying anywhere within the absorption band and maximum or near maximum benefit is obtained by treatment with any frequency lying within the range defined by the broad and substantially level plateau of the absorption curve. The frequency range of 43 to 44 m. c. used in the apparatus herein described in detail was chosen as lying well within the flat top of the curve on the one hand and on the other as frequencies which can be efficiently and stably generated by commercially available tubes.

A theoretical optimum frequency of treatment may exist in the range of 90 to 100 m. c., but it is not apparent within the rather broad limits of experimental error imposed by the necessarily small number of seeds which can be germinated under rigidly controlled conditions and by the varied conditions of germination to which large samples are necessarily subjected.

Within a relatively large number of controlled experiments definite statistical optima have been shown to exist as to rate of absorption of energy, total energy absorbed, temperature rise and final temperature, but no sharp optimum is evident as to frequency, so long as the frequency lies within the range above given.

The fact should not be lost sight of, however, that the temperature rises observed cannot be accounted for entirely by the energy supplied to the seeds by the oscillator. Chemical energy is released within the seed by the treatment. In the experiments showing the optimum temperature rise of carrot seeds, for example, the treatment which resulted in the optimum temperature rise of 15° C. resulted from an energy input from the oscillator which could, of itself, account for a rise only in the neighborhood of 6° C., leaving a remainder of about 9° C. which can only be accounted for by a release of chemical energy within the seeds.

Chemical analysis of treated and untreated seeds indicates that the changes responsible for this release in energy consist essentially of a decrease in both the reducing sugar and total sugar content of the endosperm and embryo accompanied by an increase in ketose sugars, which would argue that the effect is a change into a dehydrated form of structurally related sugars having a larger number of ketonic groups, oxygen bridges, or both. Analyses of seeds of the batches which are to receive treatments showing the greatest increase in germination indicated that while the total sugar had dropped by from 40 to 50% the fructose content had approximately doubled in percentage.

Some change in fat content was also shown in all of the treated seeds. These changes, however, did not prove consistent enough as between seeds of various kinds to offer any criterion as to the generally beneficial effect of the treatment. Thus, for example, onion seeds showed an increase in fat content after treatment whereas carrot seeds, generally, showed a decrease.

The chemical changes thus referred to offer a means of determining the most effective treatment of seeds of a given crop without the absolute necessity for germination tests. It may quite safely be assumed that, provided the temperature rise has not exceeded the critical values as above set forth, a treatment which will give a marked increase in the ketose sugar content of the seeds will prove beneficial, the increase being preferably of the order of 100% of the initial value.

I claim:

1. The method of treating seeds to increase the percentage of germination thereof which comprises the steps of subjecting said seeds to an oscillating electric field of a frequency between 10 megacycles and 300 megacycles per second, adjusting the strength of said field to cause said seeds to absorb power therefrom at a rate of from 7 to 30 watts per milliliter and removing said seeds from said field when the temperature thereof has increased by from 10° C. to 25° C. to a maximum of not more than 60° C.

2. The method in accordance with claim 1 where the frequency of oscillation of said field is within the range between 30 megacycles per second and 250 megacycles per second.

3. The method in accordance with claim 1 wherein the field-strength is adjusted to cause said seeds to absorb energy at a rate within ten percent, plus or minus, of 14 watts per milliliter.

4. The method in accordance with claim 1 which includes the step of compacting said seeds to minimize the air included therein prior to subjecting them to said field.

5. The method in accordance with claim 1 wherein the total energy absorbed from said field by said seeds is within 10% of 37.5 calories per milliliter.

6. The method in accordance with claim 1 wherein the final temperature to which said seeds are raised is between 40° C. and 50° C.

7. The method of treating seeds to increase the percentage of germination thereof which comprises the steps of establishing an alternating electric field of a frequency in the band above 10 megacycles per second and below 300 megacycles per second and with an R. M. S. voltage gradient of from 340 to 360 volts per centimeter, compacting a mass of seeds to minimize the included air, subjecting said seeds to said field in such manner as to permit free escape of gases and vapors therefrom, and discontinuing the treatment when the energy absorbed by the mass of seeds is equal to 37.5 ±10% calories per milliliter.

References Cited in the file of this patent

UNITED STATES PATENTS

| 1,678,418 | Bennett | July 24, 1928 |
| 1,972,050 | Davis | Aug. 28, 1934 |
| 2,006,265 | Davis | June 25, 1935 |
| 2,040,600 | Davis | May 12, 1936 |
| 2,064,522 | Davis | Dec. 15, 1936 |
| 2,308,204 | Parry | Jan. 12, 1943 |
| 2,474,649 | Birdseye | June 28, 1949 |
| 2,485,660 | Robertson | Oct. 25, 1949 |

FOREIGN PATENTS

| 417,501 | Great Britain | Sept. 28, 1934 |

OTHER REFERENCES

Chemical Abstracts, vol. 24, p. 5336 (1930).

Mezzadroli: Chimie et Industrie (France), vol. 23, Special No., March 1930, pp. 521–523.

Davis: Scientific American, vol. 148, pp. 272–273 (May 1933).

Davis: Scientific American, vol. 158, pp. 238–239 (April 1938).

Jonas: Physiologia Plantarum, vol. 5, No. 1, pp. 41–51 (1952).

Jonas: Electronics, vol. 26, No. 4, pp. 161–163 (April 1953).